United States Patent
Gokhale et al.

(10) Patent No.: US 11,973,346 B2
(45) Date of Patent: Apr. 30, 2024

(54) TRANSACTIVE ENERGY SYSTEM AND METHOD

(71) Applicant: Eaton Intelligent Power Limited, Dublin (IE)

(72) Inventors: Manoj Gokhale, Pune (IN); Chinmai Mannem, Pune (IN)

(73) Assignee: EATON INTELLIGENT POWER LIMITED, Dublin (IE)

(*) Notice: Subject to any disclaimer, the term of this patent is extended or adjusted under 35 U.S.C. 154(b) by 0 days.

(21) Appl. No.: 18/000,748

(22) PCT Filed: Dec. 14, 2020

(86) PCT No.: PCT/EP2020/085980
§ 371 (c)(1),
(2) Date: Dec. 5, 2022

(87) PCT Pub. No.: WO2021/249663
PCT Pub. Date: Dec. 16, 2021

(65) Prior Publication Data
US 2023/0216298 A1  Jul. 6, 2023

(30) Foreign Application Priority Data
Jun. 9, 2020 (IN) .............................. 202011024207
Aug. 6, 2020 (GB) ...................................... 2012252

(51) Int. Cl.
*H02J 3/06* (2006.01)
*H02J 3/14* (2006.01)

(52) U.S. Cl.
CPC . *H02J 3/06* (2013.01); *H02J 3/14* (2013.01)

(58) Field of Classification Search
CPC ........ H02J 3/06; H02J 3/14; H02J 3/12; H02J 3/08; H02J 3/144; H02J 3/28
See application file for complete search history.

(56) References Cited

U.S. PATENT DOCUMENTS

2011/0307115 A1* 12/2011 Pereira ...................... H02J 3/14
700/296
2012/0109392 A1   5/2012 Hanks et al.
(Continued)

FOREIGN PATENT DOCUMENTS

WO   2019/141511 A1   7/2019

OTHER PUBLICATIONS

Shukla Raj Mani, et al., "A Neural Network-Based Appliance Scheduling Methodology for Smart Homes and Buildings with Multiple Power Sources", 2016 IEEE International Symposium on Nanoelectronic and Information Systems (INIS), IEEE, Dec. 19, 2016 (Dec. 19, 2016), pp. 166-171, XP033050213, DOI: 10.1109/INIS.2016.046; [retrieved on Jan. 23, 2017] pp. 166-177.

*Primary Examiner* — Lincoln D Donovan
*Assistant Examiner* — Alex W Lam
(74) *Attorney, Agent, or Firm* — LEYDIG, VOIT & MAYER, LTD.

(57) ABSTRACT

A method of energy distribution from a plurality of energy sources to a plurality of loads wherein a set of selection options for a load are determined. Values are established for the selection options for each loads. The loads are then ordered into a load order according to a load ordering parameter. The energy sources are ordered in a plurality of sequences, where each sequence corresponds to a possible set of values for the selection options and wherein at least one energy source appears in more than one of the plurality of sequences. The loads are then matched with the energy sources according to the load order, with the sources in the sequence corresponding to the set of values for the selection options established for that load. A computing system designed to perform this method, and an electrical grid incorporating such a computing system are also described.

21 Claims, 13 Drawing Sheets

(56) References Cited

U.S. PATENT DOCUMENTS

2012/0249068 A1 10/2012 Ishida
2015/0326023 A1 11/2015 Adelberger et al.
2016/0092978 A1 3/2016 Lian et al.

\* cited by examiner

| Buyers | Price(¢) | Quantity | Green Power | Resiliency | None |
|---|---|---|---|---|---|
| B1 | 9 | 20 | [ ] | [✓] | [ ] |
| B2 | 6 | 50 | [✓] | [ ] | [ ] |
| B3 | 5 | 30 | [ ] | [ ] | [✓] |
| B4 | 8 | 25 | [✓] | [ ] | [ ] |
| B5 | 7.5 | 40 | [ ] | [ ] | [✓] |

51

Buyers

Inputs:
1. Price
2. Quantity
3. Green power (Y/N)
4. Resiliency (Y/N)

| Sellers | Green power | | | Brown power | | |
|---|---|---|---|---|---|---|
| | Price(¢) | Quantity | Resiliency factor | Price(¢) | Quantity | Resiliency factor |
| S1 | - | - | - | 6 | 20 | 0.9 |
| S2 | 5 | 25 | 0.5 | 3 | 10 | 0.6 |
| S3 | 4.5 | 30 | 0.4 | 2.5 | 15 | 0.7 |
| S4 | - | - | - | 5.5 | 50 | 0.85 |

52

Sellers

Inputs:
1. Price
2. Quantity
3. Resiliency factor

TRANSACTIVE ENERGY SYSTEM AND METHOD

TECHNICAL FIELD

The disclosure relates to a transactive energy system and method. In particular, the disclosure relates to a system for effective matching of energy sources and loads, especially in relation to distributed energy resources.

BACKGROUND

Conventionally, most energy sources have been centralized, and power distribution has typically involved transmission of electrical power over long distances over a national or regional grid. Local power generation has generally been used by local users to meet some or all of their power needs directly, as an alternative or supplement to power from the grid.

Other models of power generation have developed, particularly since the increasing development of renewable power sources, which are typically smaller in scale and more variable in operation pattern than large coal, gas or nuclear power plants. Renewable power sources will often function best as part of a distributed energy system (also called distributed generation or on-site generation, or decentralized energy). This involves electrical generation and storage performed by a variety of small, grid-connected or distribution system connected devices, known as distributed energy resources (DER). These distributed energy resources will typically have capacities of 10 MW or less. A distributed energy system will typically be a hybrid system, comprising multiple power sources of different types, along with energy storage capability, so the system is a distributed energy generation and storage system.

Distributed energy generation and storage systems are well adapted to supporting local environments—they will typically be managed as smart grids through an appropriate interface, and they may form microgrids disconnected or disconnectable from a main regional power grid. This approach allows autonomous operation and may promote grid resilience and lower the overall carbon footprint of power generation.

One challenge of using distributed energy resources in this way is that it can be challenging to match up producers and consumers, as there are likely to be a number of different producers and consumers in the same distributed energy system, and there may be significant variety in the nature of the power producers and providers and in the characteristics of the consumers. For example, some power producers may provide varying capacity (typically the case for renewable power) and some consumers may require a highly reliable supply, or they may wish only to receive power from renewable sources. Storage providers may seek to consume power when it is available below a certain cost and provide it when a higher cost can be achieved on the market. This type of balance can be managed by strong control over the relevant grid—however, this will typically not lead to an efficient solution. It would be desirable to find a way of managing the distribution of generated and stored power to consumers so that it satisfies the requirements of generators and consumers (and any other relevant parties) as effectively as possible.

SUMMARY OF DISCLOSURE

In a first aspect, the disclosure provides a method of energy distribution from a plurality of energy sources to a plurality of loads, the method comprising: determining a set of selection options for a load; establishing values for the selection options for each of the plurality of loads; ordering the loads into a load order according to a load ordering parameter; ordering the energy sources in a plurality of sequences, where each sequence corresponds to a possible set of values for the selection options and wherein at least one energy source appears in more than one of the plurality of sequences; and matching the loads with the energy sources according to the load order, wherein each load is matched with the sources in the sequence corresponding to the set of values for the selection options established for that load.

This approach provides for a matching between sources and loads which is fair, easy to compute, and easy to follow. It reflects the interests of both generators and consumers, and it allows each party to make an appropriate determination of its interests and to have these properly reflected in the way that energy is distributed.

In embodiments, each of the energy sources are listed in at least one of the plurality of sequences. In some embodiments, each of the energy sources may be listed in all of the sequences in the plurality of sequences.

In embodiments, the method may apply to a predetermined time slot. This allows for changes in parameters over time to be properly responsive to system changes and to the capabilities and demands of the parties. Each of the energy sources and each of the load may then have an associated energy amount for the time slot. When the associated energy amount for a energy source or a load has been allocated by matching, that energy source or load may then be removed from each sequence or from the load order. The sources may be ordered in each sequence according to one or more source ordering parameters. For example, the load ordering parameter and one of the source ordering parameters may be price of a unit of energy. This load ordering may then comprise an ordering of the loads from highest to lowest price per unit of energy. One of the sequences may comprise an ordering of all the sources from lowest to highest price per unit of energy. One of the source ordering parameters may be resilience of the source, and one of the sequences may then comprise an ordering of some or all of the sources from highest resilience to lowest resilience. One of the selection options may be the nature of energy source, and if so one sequence may comprise an ordering of some or all of the sources according to energy source. Such a sequence may further comprise a secondary ordering according to one of the source ordering parameters.

In embodiments, the method further comprises transferring energy in accordance with the matching process, and measuring the energy transferred from each energy source and received by each load. It may further comprise a settlement process for payment for energy transfer responsive to the measurement of energy transfer, the settlement process comprising an adjustment process used when an amount of energy transferred did not correspond to an amount of energy identified for transfer in the matching process.

In a second aspect, the disclosure provides a computing system having a processor and a memory, wherein the processor is programmed to perform a method as described in the first aspect.

In a third aspect, the disclosure provides an electrical grid comprising a computing system as described in the second aspect and means for receiving power from the set of energy sources and for routing power to the set of loads.

Such an electrical grid may be adapted to obtain or receive measurement of energy transfer to each of the loads of the set of loads.

In a fourth aspect, the disclosure provides a data storage medium having a computer program stored thereon, wherein the computer program is adapted to program a computing system to perform the method of the first aspect.

BRIEF DESCRIPTION OF FIGURES

Embodiments of the disclosure will now be described, by way of example, with reference to the following figures, in which.

DETAILED DESCRIPTION

Figure 1:
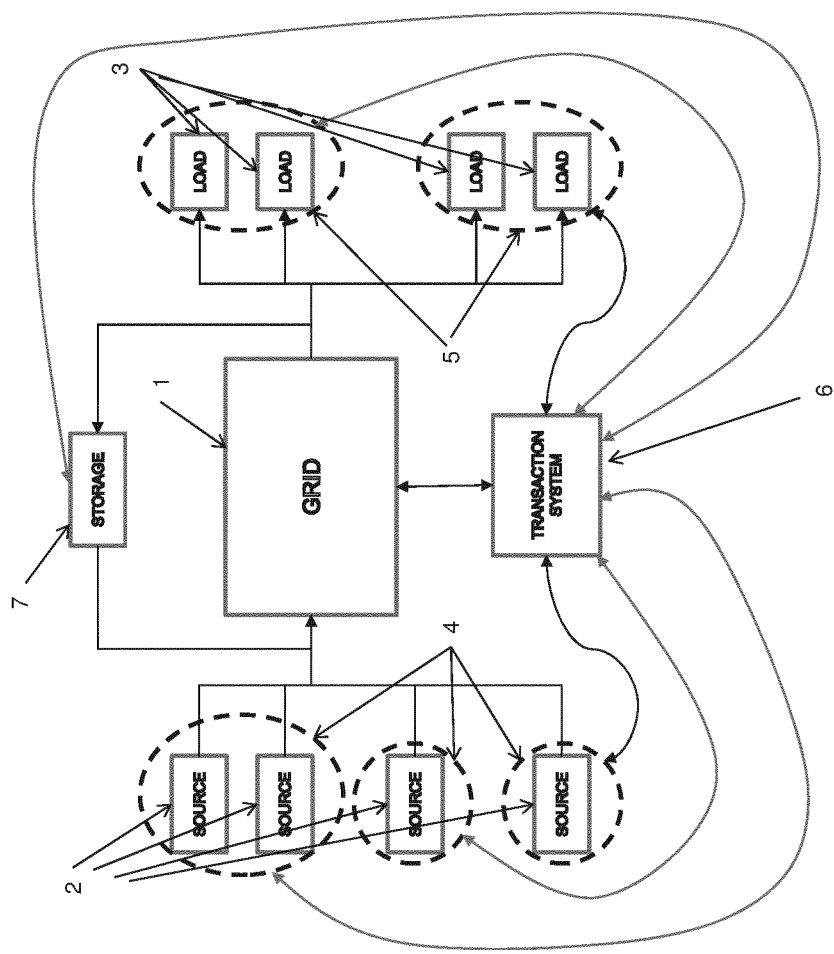
FIG. 1 illustrates schematically a transactive energy system in general terms.

FIG. 1 illustrates a transactive energy system in general terms. The system involves a power distribution system or grid 1 which receives power from a variety of power sources 2 and provides power to a variety of loads 3. The power sources 2 are associated with providers 4 and the loads 3 associated with consumers 5—the providers 4 and the consumers 5 are able to transact for power using a transaction system 6. The results of the transactions determined at the transaction system 6 determine the commitments of the providers 4, and so the contribution of the different sources 2 into the grid 1. The grid 1 will determine the actual demand and power provision to the different loads 3, and it will report back to the transaction system 6. The transaction system 6 will then determine what payment is required—typically, both the providers 4 and the consumers 5 will have accounts with the transaction system 6, and payments will be made through these accounts.

This arrangement allows for some complexity. For example, power storage 7 may operate as either a provider or a consumer. If power prices are high, the power storage may sell power and act as a provider, but if they are low, it may buy power and act as a consumer. Preferably, the transaction system 6 operates to change prices over time to reflect actual conditions of supply and demand in the power distribution system. Supply and demand will vary significantly during the course of a day, so it is desirable for the transaction system 6 to respond on a much shorter timescale than this—typically a timescale of minutes.

Figure 2:
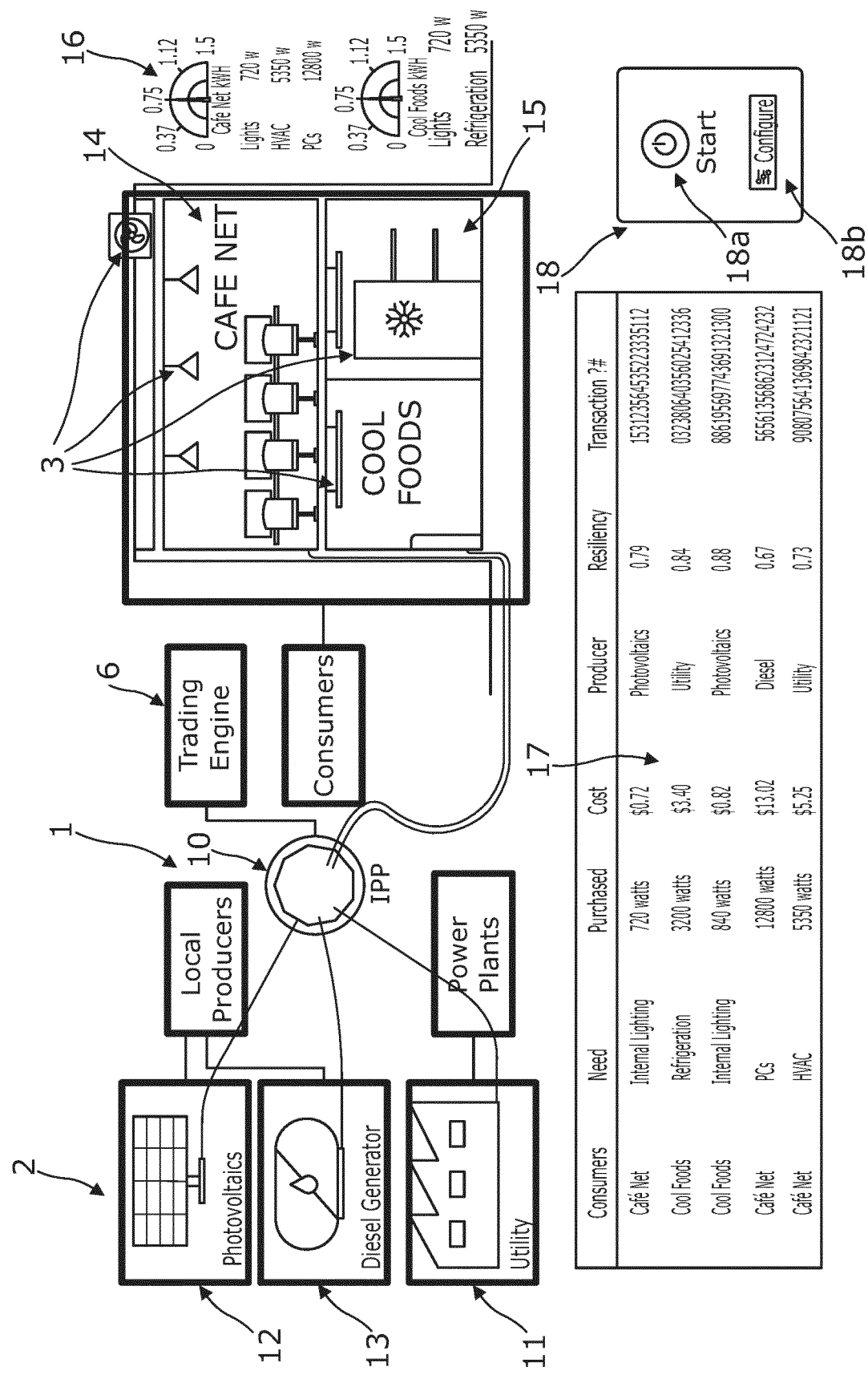
FIG. 2 shows elements of a micro-grid system that could be used as a transactive energy system.

FIG. 2 illustrates a microgrid example of a transactive energy system. Here, three different types of producers are shown through three different power sources 2—one is a conventional major power plant 11, whereas two are local producers: one renewable (photovoltaic array 12) and one conventional (diesel generator 13). Each of these producers has different qualities—in addition to being under different control and so prepared to offer power at different price points, they will also have different resilience (ability to reliably offer power at all times over a commitment) and obtain energy from different sources (brown or green power). The producers and their power sources 2 are connected to the loads 3 of the consumers through a microgrid 1, the key element of which is power platform 10, which interacts with transaction system (trading platform) 6. Here there are two consumers 5, Café Net 14 and Cool Foods 15, each of which have a number of loads 3. The consumers may have specific requirements (for example, Café Net may require green energy to be provided wherever possible) and loads may have specific requirements (for example, the refrigeration units at Cool Foods may prioritise resilience over any other requirement). As is shown in FIG. 2, the metering 16 for the building containing Café Net 14 and Cool Foods 15 indicates the actual consumption of both the consumers and the specific loads for each consumer.

A transactive energy system output 17 is shown in FIG. 2—this is shown for a specific period. This indicates each load of each consumer that has a demand during this period, and how the demand is met from a particular producer—the cost is identified, as is in this case the resiliency (this may be relevant, for example, if resilience expected of the producer was not in practice achieved). Each such element is identified by a different transaction ID. An interface is shown 18 with options to start 18a and configure 18b. Configuration allows producers and their sources, and consumers and their loads, to be added to or removed from the system. When the system is started, it will preferably simply continue to operate, with one time period succeeding another automatically, the criteria and transactions for one time period have been determined during the preceding time period or periods.

An approach to operating a transaction system or trading platform such as that illustrated above according to embodiments of the disclosure will now be described with reference to FIGS. 3 to 13. An appropriate computing system for use in implementing such a trading platform is shown in FIG. 3.

Figure 3:
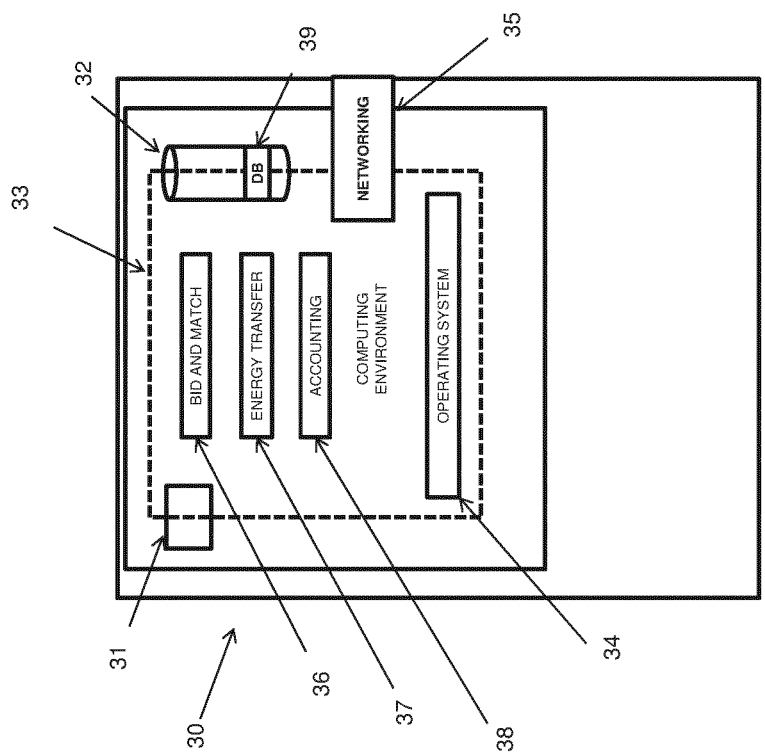
FIG. 3 shows a computing system suitable for use to implement a method of operating a transactive energy system according to embodiments of the disclosure.

FIG. 3 shows a computing system adapted for implementing a trading platform according to embodiments of the disclosure. The computing system 30 has a processor 31 and a memory 32 between them defining a computing environment 33 under the control of an operating system 34. The computing system has one or more networking connections 35 to allow it to communicate with buyers, sellers and the grid. The computing environment 33 runs one or more relevant applications—here, these are shown to be a bidding and matching system 36, an energy transfer management system 37 and an accounting system 38, between them defining a transactive energy system—a transactive system database 39, holding details of buyers, sellers, loads, sources and transactions, is located in the memory 32. While shown as three separate applications, these may in practice be implemented as separate subsystems of a single transactive energy application.

Figure 4:
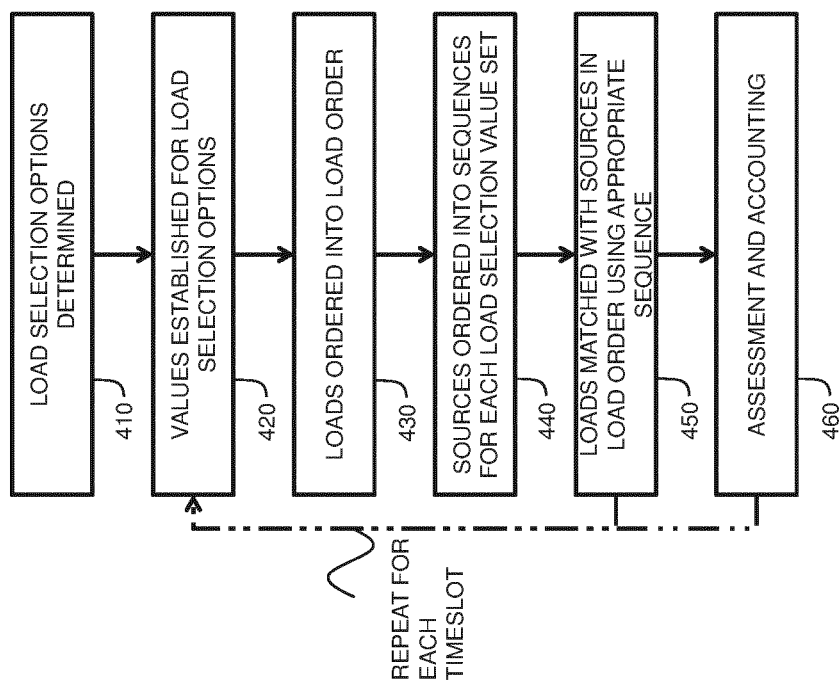
FIG. 4 shows a method of operating a transactive energy system in general terms according to embodiments of the disclosure.

FIG. 4 shows a method of operating a transactive energy system in general terms according to embodiments of the disclosure—the method achieves power distribution from a plurality of power sources to a plurality of loads by a matchmaking process. First of all, a set of selection options are determined 410 for a load—this is shown as a one-off process, and it may be considered part of the initial system configuration. The following steps would typically be carried out for a specific power distribution timeslot, and they would be repeated for subsequent timeslots. Values are established 420 for the selection options for each of the plurality of loads. The loads are then ordered 430 into a load order according to a load ordering parameter. The power sources are also ordered 440, but these are ordered into a plurality of sequences, where each sequence corresponds to a possible set of values for the selection options. This allows different priorities to be established for different loads, while retaining a simple and easy to analyse system. The loads are then matched 450 with the power sources according to the load order, wherein each load is matched with the sources in the sequence corresponding to the set of values for the selection options established for that load. This process may then re-start for the subsequent timeslot. After a timeslot, the energy flows can be assessed and accounted 460 for according to the matching of loads and sources, with adjustments made for any variation from what was agreed using the matchmaking process.

FIGS. 5 to 13 show operation of one embodiment of such a transactive energy system. The transactive energy system operates over a succession of transaction cycles, and the operation over the embodiment for one transaction cycle is discussed. The time period of a transaction cycle needs to be short enough to reflect varying supply and demand appropriately, but long enough that the burden of (and time required for) computation and of accounting is not inappropriately high—this will typically be of the order of minutes (15 minutes is an exemplary length of cycle here).

Figure 5:
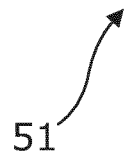
FIG. 5 shows exemplary inputs for a transactive energy system according to an embodiment of the disclosure.
Figure 5:

FIG. 5 shows the inputs for a new transaction cycle—these are in the form of a buyer list 51 and a seller list 52. The buyer list 51 may comprise a consumer's entire requirement (if the consumer has the same requirement for all loads) or may have separate loads listed as separate buyers if their requirements are different. The buyer list 51 identifies each buyer and indicates both the price the buyer is prepared to pay, and the quantity of power required (this may in practice be a best estimate rather than an exact amount, as discussed below). However, in addition to these requirements, the buyer adds on a choice between one of three criteria: green power, resilience, and no preference. As will be discussed further below, these three criteria are used to determine which one of three different paths will be used in a matchmaking process to determine how the buyer's order will be fulfilled by the sellers using the transactive energy system.

The seller list 52 similarly identifies each seller, together with a quantity and a price—however here, the seller indicates their provision of brown power and green power separately (this could obviously be further divided into separate sources, as would be needed if power from separate sources of a seller were to be individually priced). In addition to this, a resilience factor is indicated for each separate source. This may be a resilience factor proposed by the seller—in which case, there may be a penalty assessed if a proposed level of resilience is not met—or may be one determined by the transactive energy system on the basis of historical performance. These inputs must be present before the transactive energy system determines the outcome for the next cycle. For a fifteen-minute cycle, this may be for example five minutes before the start of the cycle to be determined.

Figure 6:
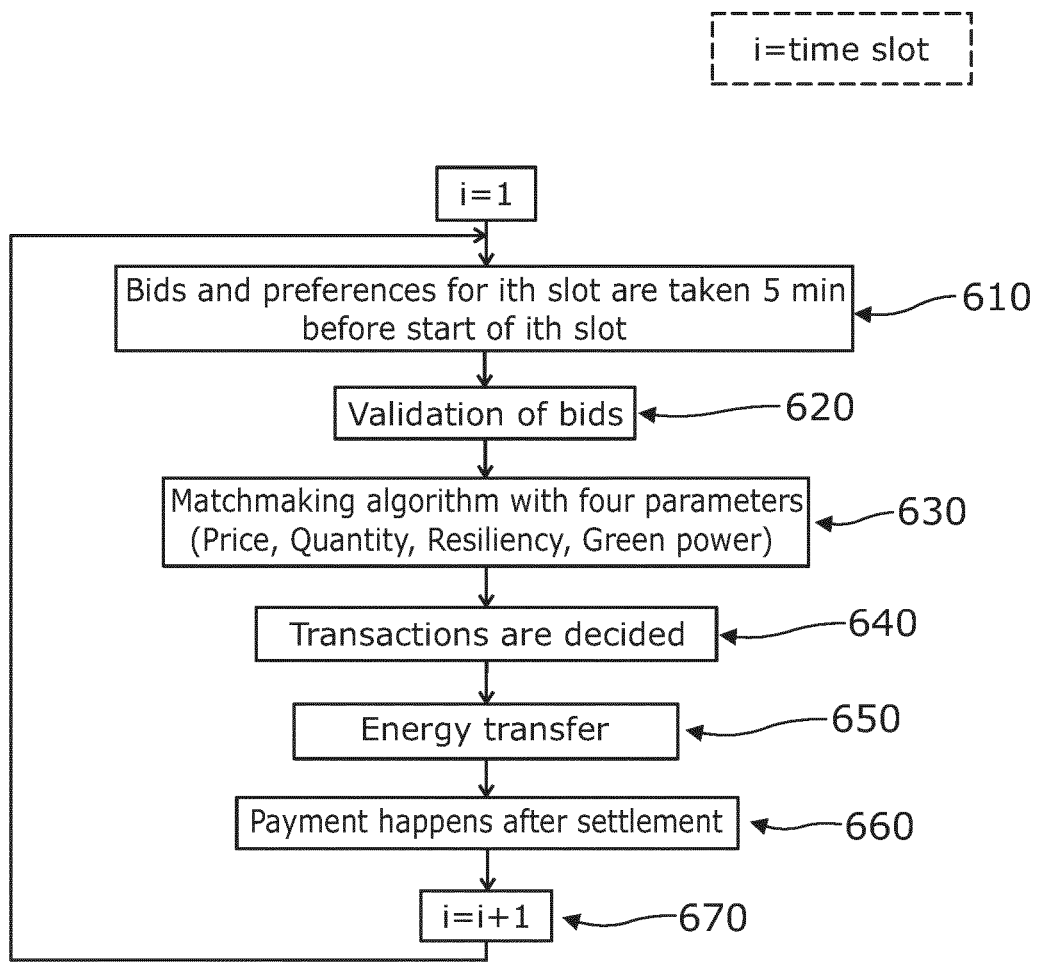
FIG. 6 illustrates an overall process for managing energy transactions for a timeslot according to an embodiment of the disclosure.

FIG. 6 shows in flow diagram form the overall algorithm for the cycle. For the ith cycle, bids are taken 610 five minutes before the start of the ith slot. The individual bids are all validated 620 to ensure that requirements can be met. This is followed by the main matchmaking process 630 to pair buyers and sellers, after which transactions are determined 640, and energy is transferred 650 during the course of the ith slot. Settlement and payment 660 follow, the process having already continued 670 to establish the position for the i+1th and subsequent slots.

Figure 7:
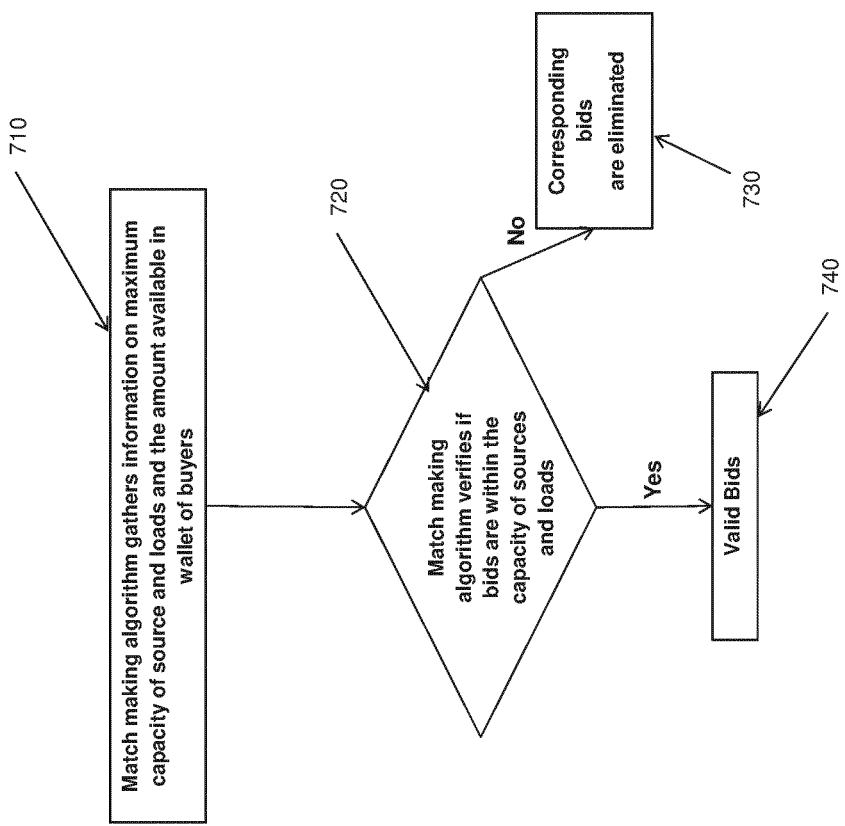
FIG. 7 illustrates a bid validation process for use in the process of FIG. 6.
Figure 8:
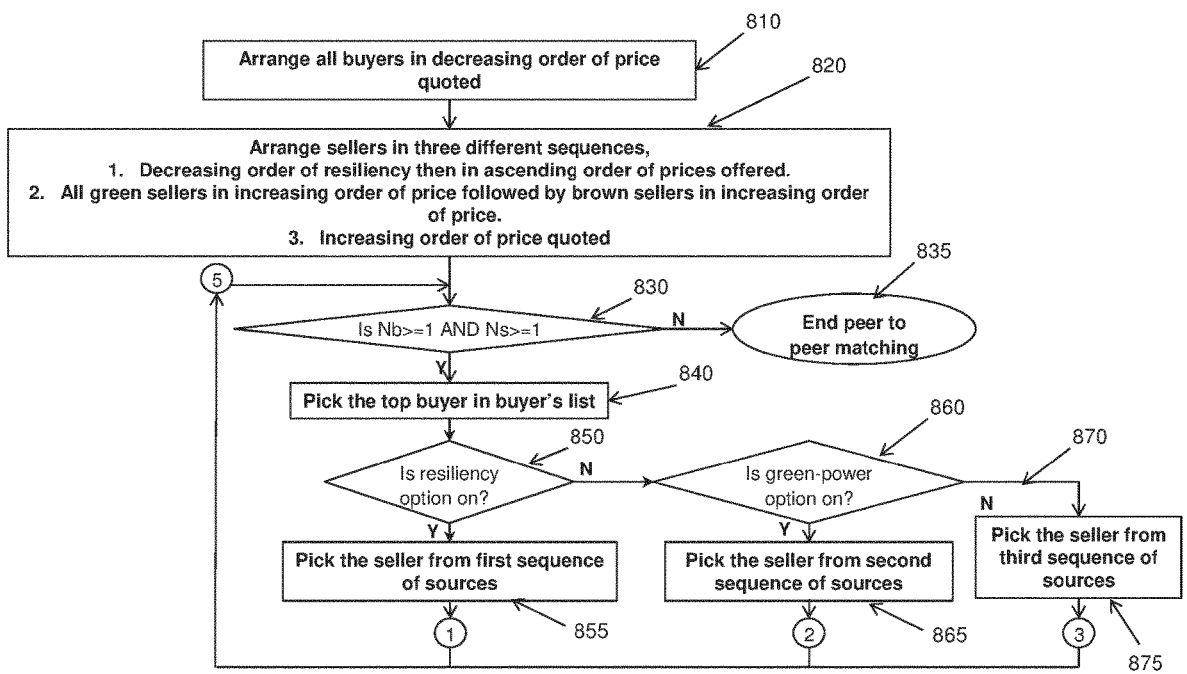
FIG. 8 illustrates a matchmaking process for use in the process of FIG. 6 to match sources and loads.

The bid validation process is shown in FIG. 7. First of all, the matchmaking algorithm gathers information 710 on the maximum capacity of sources and loads, and it establishes the state of consumer accounts. The bids are then validated 720 accordingly, with Q=Quantity, P=Price, i=slot:

$$\text{Source}Q\_n,i <= \text{Source}Q\_n,\max \quad (1)$$

where the maximum capacity of the nth source (SourceQ_n,max) is the maximum energy limit in kWh available with the nth source during that time-slot period.

$$\text{Load}Q\_n,i <= \text{Load}Q\_n,\max \quad (2)$$

where the capacity of the nth load (LoadQ_n,max) is the maximum energy limit in kWh that can be consumed by the nth load during that time-slot period.

$$\text{Load}P\_n,i <= \text{Wallet}\_n,i \quad (3)$$

where LoadP_n,i is the load price bid for the ith slot for the nth customer, and the wallet amount (Wallet_n,i) is the current available money balance in nth customer wallet after previous transaction.

In this way, it can be established for each bid whether it is within the capacity of the source, or within the capacity (and can be afforded) by the consumer. Bids that do not meet these constraints are eliminated 730, whereas bids that do meet the constraints 740 are considered in the matchmaking process proper shown in FIG. 8.

The first steps in the matchmaking process involve ordering the buyers and the sellers. The buyers are ordered 810 into a single sequence, in decreasing order of price offered, so that the buyers who have offered the highest price per unit will be processed first. Other parameters could be used for this ordering—for example, more critical loads (such as hospitals and data centres) could be listed first. It should be noted that criticality can be captured through resilience, so loads could be ordered by decreasing resiliency and then by decreasing price if two loads have the same resiliency demand. The sellers are ordered 820 into three separate sequences. In the embodiment shown here, each sequence contains all the sellers, but they are ordered differently in each sequence. The first sequence is based entirely on resilience—the most resilient source is listed first, with the lowest resilience source listed last. The second sequence is determined by whether the energy source is green or brown—all green energy sources are listed first, in increasing order of price (so the cheapest green source will be selected first), followed by all brown energy sources in increasing order of price. The third sequence is determined purely by price, and sources are listed in increasing order of price.

Other sequences could be used in addition to or instead of the three selected here—the seller could be offered preferences of different types, or sources that did not meet a particular criterion could be left off a sequence altogether (allowing, for example, a consumer not to accept energy from a source that was not a green source, for example). It is however important to the model that at least some sources are available in multiple sequences.

The algorithm then checks 830 to see whether the matchmaking process is out of either sellers or buyers—if so it will stop 835 as the process will be set, but if not it continues by picking 840 the top buyer remaining in the buyers list, and proceeding to find a source to match that buyer. If the buyer has selected resiliency 850, the first sequence will be used 855, whereas if the buyer has selected green power 860, the second sequence will be used 865. If the buyer has not selected either resiliency or green power 870, the third sequence will be used 875. These alternatives are discussed further in FIGS. 9 to 11.

Figure 9:
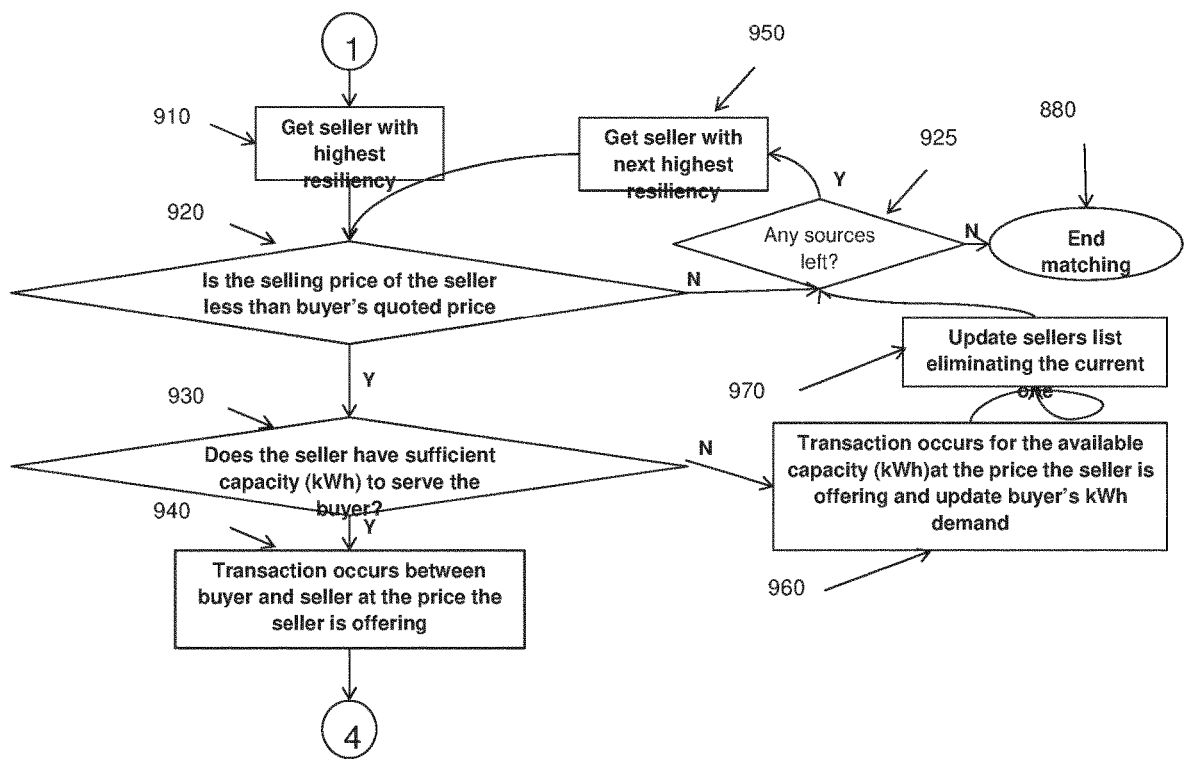
FIG. 9 illustrates the matching process following FIG. 8 where resilience is prioritised.

FIG. 9 shows how the algorithm progresses if the resiliency option has been selected and the first sequence is considered. The current first source on the first sequence—the source with the highest resilience that still has power available—is considered 910. It is determined 920 whether the seller's selling prices is equal or lower to the buyer's buying price—if so, then there will be a transaction between the relevant seller and buyer to provide power from the relevant source to the relevant load. However, it needs to be determined 930 whether the seller has sufficient capacity from the relevant source to the serve the relevant load. If so, then the transaction will simply occur 940 between the identified buyer and seller at the price the seller is offering, and the matchmaking process can progress with the reconciliation stage shown in FIG. 12.

If during step 920 the buyer cannot match the selling price, it is necessary to determine whether there are any further sources left 925. If there are no affordable sources, then the buyer's order cannot be met, and the matchmaking process terminates 880 for that buyer. If there are further sources remaining, the process continues 950 with the next source in the list—the source with the next highest resiliency.

If there is a transaction established 920, but the seller does not have enough capacity with that source to service the load 930, then this transaction is established but the process continues 960 to match the remaining load capacity, followed by removal of this source 970 from the list of sources and so from each sequence (as all its capacity has been used). The process then continues by establishing whether there are further sources 925 as in the previous case, where the buyer would not match the seller's price. If a match can be made, the buyer will have obtained the most resilient remaining source that they can afford.

Figure 10:
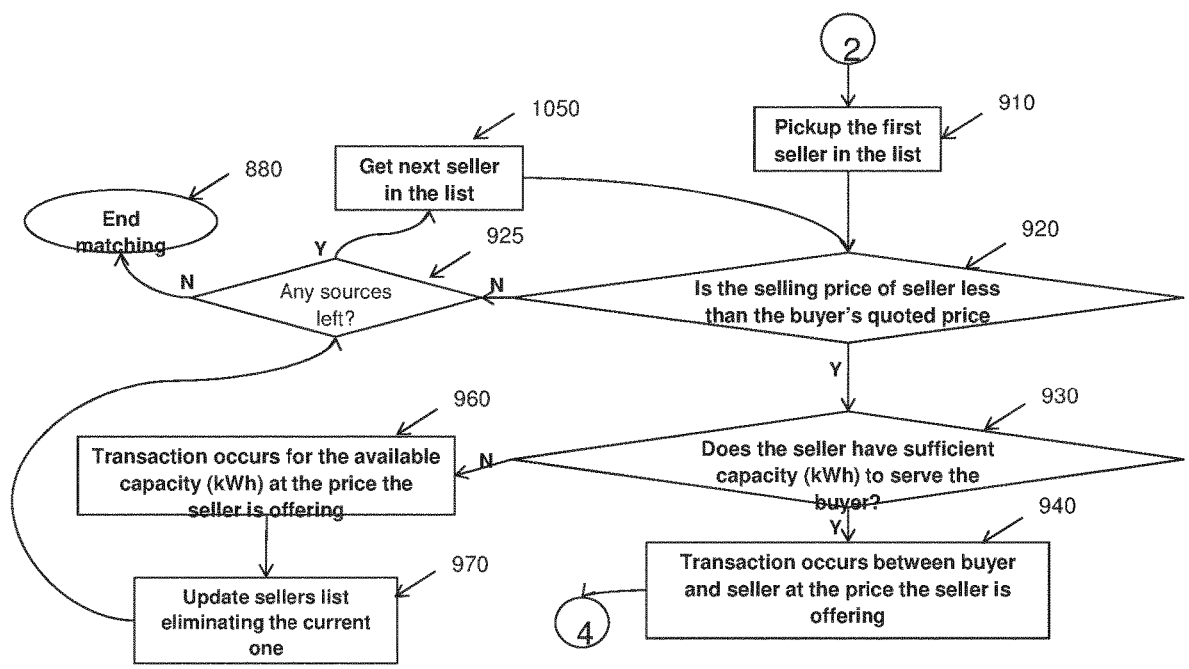
FIG. 10 illustrates the matching process following FIG. 8 where green power is prioritised.

Before considering the reconciliation process, which is common to each sequence, the second and third sequences will be considered. If the green energy option is selected, the process continues as shown in FIG. 10. As can be seen, the process is essentially the same as in the first sequence case—the only difference of note is that selecting 1050 the next source in the list will be different in character—instead of being the next most resilient source, it will be the next source in the list, which will either be the next most expensive source of the same type, or, at the bottom of the green source list, will be the cheapest brown source available. If the buyer can find a match, it will be the cheapest green source still available, or if no green source is available, the cheapest brown source still available.

Figure 11:
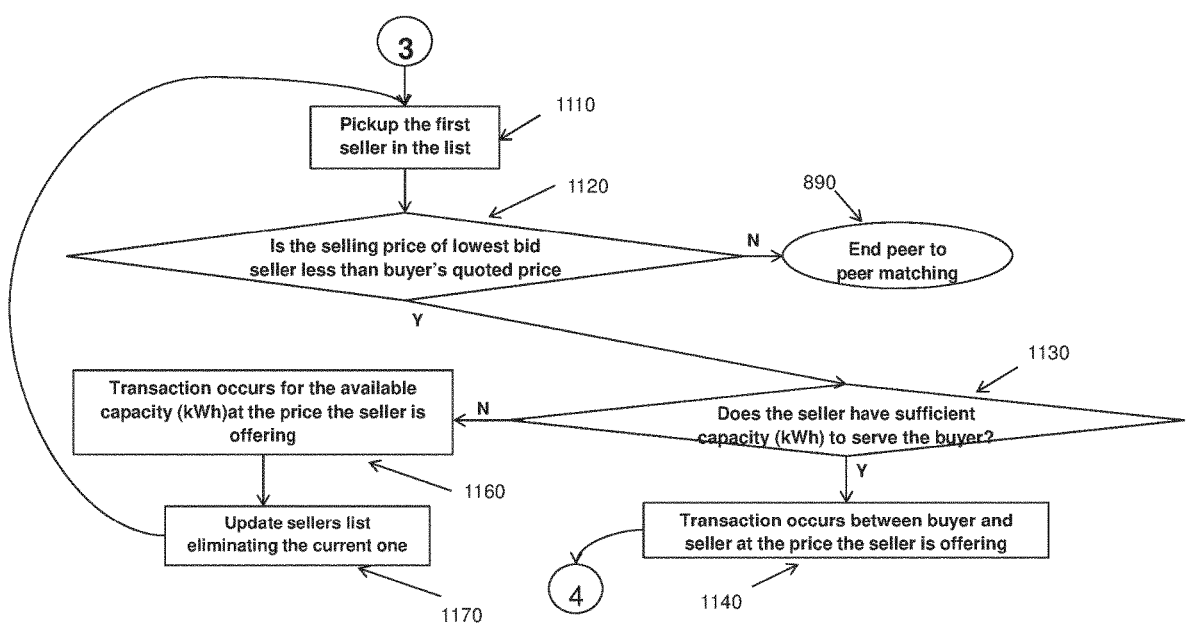
FIG. 11 illustrates the matching process following FIG. 8 where price is prioritised.

The third sequence process, shown in FIG. 11, is slightly simpler because the only criterion used for assessment is price. The first seller in the list is considered 1110, and if the buyer cannot meet the first seller's price in the matching process 1120, then they will not meet the price of any other seller, and the matchmaking process terminates 890 for that buyer. The process would in fact terminate for any subsequent buyer also—any subsequent buyer would be offering a lower price, and the first seller has the lowest price of any remaining sellers, so no further matches are possible. If the matching process 1120 is successful, and if in capacity matching 1130 the seller can meet the buyer's full capacity with the relevant source, then that is established 1140 as a transaction. If that source cannot meet the buyer's capacity 1130, a transaction is established 1160 for the available source capacity and the source is removed 1170 from the list. However, at this point, the process simply continues with the next source in the list.

Figure 12:
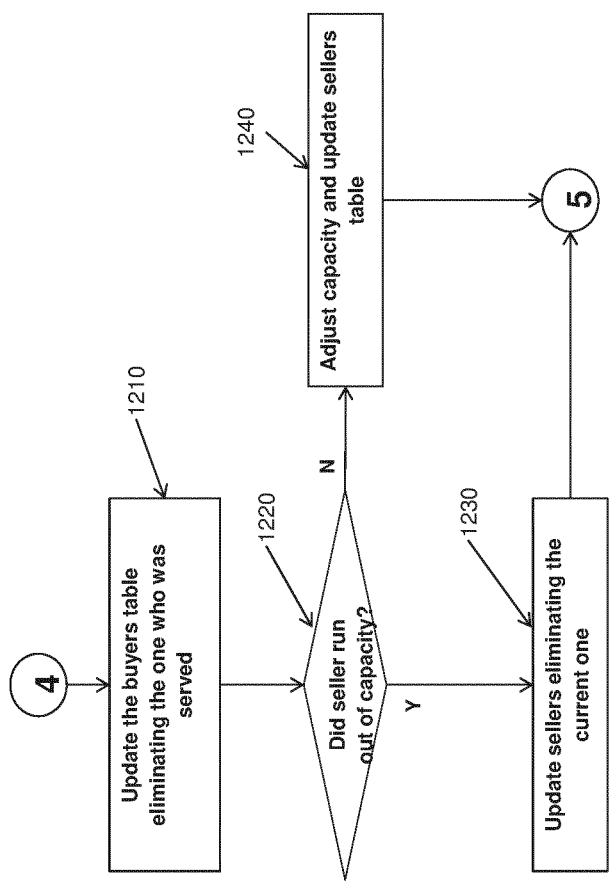
FIG. 12 illustrates a reconciliation process used for the FIG. 8 process after matching for a load.

After the transaction or transactions are established for a buyer, a common reconciliation process is followed as shown in FIG. 12. First of all, the buyer table is updated 1210 to remove the buyer that has transacted. After this, it is determined 1220 whether the source involved in the final transaction for that load has used all its capacity—if so, it is eliminated 1230, but if only part of its capacity has been used, the sellers table is updated 1240 by leaving that source present but by adjusting its capacity accordingly. After this, the process moves continues as shown on FIG. 8 for the next buyer.

Reverting to FIG. 6, the result of the matchmaking process 630 is that a set of transactions are decided 640 in which the loads and the sources are matched in a clear and well-defined manner to meet buyer and seller preferences. This is followed by energy transfer 650 during the ith slot. It will often not be possible to predict exactly how much energy actually needs to be transferred during the slot—a process is needed to ensure that this is addressed fairly and effectively, and an exemplary process to achieve this is shown in FIG. 13.

Figure 13:
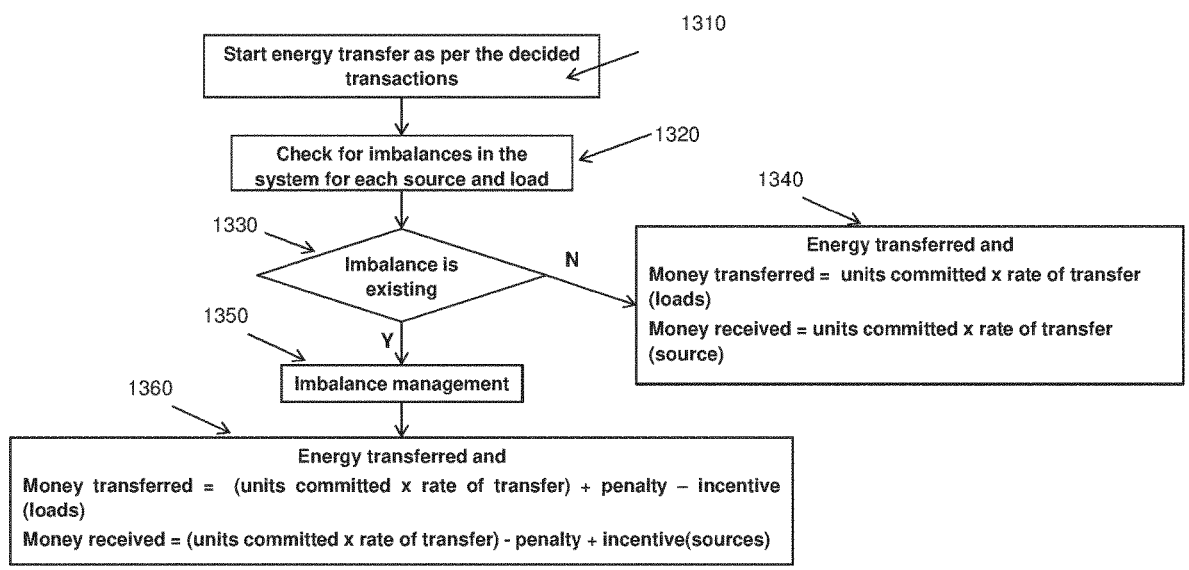
FIG. 13 illustrates energy transfer and accounting for the process of FIG. 6.

As is shown in FIG. 13, energy transfer is started 1310 according to the determined transactions. During the process of energy transfer, monitoring 1320 is used to establish 1330 whether there is an imbalance—a greater or lesser energy transfer than contracted. If there is no imbalance, accounting 1340 is simple—the buyer pays the sum for the transferred units of energy at the contracted price, and this is what the seller receives (with any adjustments such as taxation, commission for the energy matching system, etc.). If there is an imbalance, an imbalance management process 1350 will follow. Many possibilities can follow here, depending on what financial adjustment has been established in advance as appropriate—in the process 1360 shown to establish payment here, there is a transaction for the rate of transfer at the agreed price but with a penalty adjustment paid from buyer to seller (for example, for failing to take a contracted number of units, so the seller did not use their capacity) or with an incentive adjustment from seller to buyer (for example, if the buyer exceeded contracted demand without exhausting seller capacity). These penalty and incentive payments can be managed in a large number of ways, and may flow in other directions (for example, a penalty payment may be made from seller to buyer for failing to meet reliability criteria, or for failing to supply the full agreed capacity).

As the skilled person will appreciate, the scope of the disclosure is not limited to the embodiments explicitly described above, but it also extends to any other implementation falling within the spirit and scope of the claims set out below.

The invention claimed is:

1. A method of energy distribution from a plurality of energy sources to a plurality of loads, the method comprising:
   determining a set of selection options for a load;
   establishing values for the selection options for each of the plurality of loads;
   ordering the loads into a load order according to a load ordering parameter;
   ordering the energy sources in a plurality of sequences, where each sequence corresponds to a possible set of values for the selection options and wherein at least one energy source appears in more than one of the plurality of sequences; and
   matching the loads with the energy sources according to the load order, wherein each load is matched with the energy sources in the sequence corresponding to the set of values for the selection options established for that load.

2. The method of claim 1, wherein each of the energy sources are listed in at least one of the plurality of sequences.

3. The method of claim 2, wherein each of the energy sources are listed in all of the sequences in the plurality of sequences.

4. The method of claim 1, wherein the method applies to a predetermined time slot.

5. The method of claim 4, wherein each of the energy sources and each of the loads has an associated energy amount for the time slot.

6. The method of claim 5, wherein when the associated energy amount for an energy source or a load has been allocated by matching, that energy source or load is removed from each sequence or from the load order.

7. The method of claim 6, wherein the sources are ordered in each sequence according to one or more source ordering parameters.

8. The method of claim 7, wherein the load ordering parameter and one of the source ordering parameters is price of a unit of energy.

9. The method of claim 8, wherein the load ordering comprises an ordering of the loads from highest to lowest price per unit of energy.

10. The method of claim 9, wherein one of the sequences comprises an ordering of all the sources from lowest to highest price per unit of energy.

11. The method of claim 9, wherein one of the source ordering parameters is resilience of the source, and one of the sequences comprises an ordering of some or all of the sources from highest resilience to lowest resilience.

12. The method of claim 9, wherein one of the selection options is nature of energy source, and wherein one sequence comprises an ordering of some or all of the sources according to energy source.

13. The method of claim 12, wherein said one sequence further comprises a secondary ordering according to one of the source ordering parameters.

14. The method of claim 1, further comprising transferring energy in accordance with the matching process, and measuring the energy transferred from each energy source and received by each load.

15. The method of claim 14, further comprising a settlement process for payment for energy transfer responsive to the measurement of energy transfer, the settlement process comprising an adjustment process used when an amount of energy transferred did not correspond to an amount of energy identified for transfer in the matching process.

16. A computing system having a processor and a memory, wherein the processor is programmed to perform a method as claimed in any of claim 1.

17. An electrical grid comprising a computing system as claimed in claim 16 and means for receiving power from the set of energy sources and for routing power to the set of loads.

18. The electrical grid of claim 17, wherein the electrical grid is adapted to obtain or receive measurement of energy transfer to each of the loads of the set of loads, wherein the electrical grid is adapted to transfer energy in accordance with the matching process, and measure the energy transferred from each energy source and received by each load.

19. The electrical grid of claim 18, wherein the computing system of the electrical grid is adapted to perform the settlement process for payment for energy transfer responsive to the measurement of energy transfer, the settlement process comprising the adjustment process used when the amount of energy transferred did not correspond to the amount of energy identified for transfer in the matching process.

20. A method of energy distribution from a plurality of energy sources to a plurality of loads, the method comprising:
   determining a set of selection options for a load;
   establishing values for the selection options for each of the plurality of loads;
   ordering the loads into a load order according to a load ordering parameter;
   ordering the energy sources in a plurality of sequences, wherein each sequence corresponds to a possible set of values for the selection options, and wherein each of the energy sources of the plurality of energy sources are listed in all of the sequences in the plurality of sequences; and
   matching the loads with the energy sources according to the load order, wherein each load is matched with the energy sources in the sequence corresponding to the set of values for the selection options established for that load.

21. A method of energy distribution from a plurality of energy sources to a plurality of loads, the method comprising:
   determining a set of selection options for a load, wherein one of the selection options is nature of the energy source;
   establishing values for the selection options for each of the plurality of loads;
   ordering the loads into a load order according to a load ordering parameter;
   ordering the energy sources in a plurality of sequences, where each sequence corresponds to a possible set of values for the selection options and wherein at least one energy source appears in more than one of the plurality of sequences;
   matching the loads with the energy sources according to the load order, wherein each load is matched with the energy sources in the sequence corresponding to the set of values for the selection options established for that load;
   transferring energy from the plurality of energy sources to the plurality of loads in accordance with the matching process; and measuring the energy transferred from each energy source and received by each load.

\* \* \* \* \*